US008983862B2

(12) United States Patent
Canada (10) Patent No.: US 8,983,862 B2
(45) Date of Patent: Mar. 17, 2015

(54) INITIATING A SERVICE CALL FOR A HARDWARE MALFUNCTION IN A POINT OF SALE SYSTEM (75) Inventor: Tracy M. Canada, Fuquay Varina, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 905 days.

(21) Appl. No.: 12/022,885

(22) Filed: Jan. 30, 2008

(65) Prior Publication Data
US 2009/0192815 A1 Jul. 30, 2009

(51) Int. Cl.
G06Q 20/00 (2012.01)
G06F 15/02 (2006.01)
G06F 9/48 (2006.01)
G06F 11/07 (2006.01)
G06Q 20/20 (2012.01)
G07G 1/12 (2006.01)
G06Q 30/08 (2012.01)
(Continued)

(52) U.S. Cl.
CPC ............ *G06F 11/0775* (2013.01); *G06Q 20/20* (2013.01); *G07G 1/12* (2013.01); *G06Q 30/08* (2013.01); *G06Q 30/02* (2013.01); *G06Q 30/06* (2013.01); *G06F 11/0748* (2013.01)
USPC ................................................ 705/16; 705/9

(58) Field of Classification Search
CPC ....... G06Q 20/20; G06Q 30/06; G06Q 30/02; G06Q 20/204; G07G 1/12
USPC ...................................................... 705/16, 9
See application file for complete search history.

(56) References Cited

U.S. PATENT DOCUMENTS 4,029,951 A * 6/1977 Berry et al. ................... 700/289
4,873,631 A * 10/1989 Nathan et al. .................. 705/21
5,691,994 A * 11/1997 Acosta et al. ................. 714/784
(Continued)

FOREIGN PATENT DOCUMENTS

JP 9146771 A 6/1997

OTHER PUBLICATIONS

Felty Amy & Namjoshi Kedar, Feature Specification and Automated Conflict Detection, ACM transactions on Software engineering and Methodology, vol. 42, No. 1 Jan. 2003, pp. 1-25.*
(Continued)

*Primary Examiner* — Matthew Gart
*Assistant Examiner* — Harshad Parikh
(74) *Attorney, Agent, or Firm* — Edward J. Lenart; Kennedy Lenart Spraggins LLP (57) ABSTRACT

Methods, apparatus, and products are disclosed for initiating a service call for a hardware malfunction in a POS system, the POS system having a POS controller domains, the POS controller domain composed of a POS controller and one or more POS terminals, the POS controller operatively coupled to a service dispatcher for a hardware service provider, that include: detecting, by a POS operating system installed on the POS controller, a hardware error within the POS controller domain, the hardware error described by hardware error data; notifying, by the POS operating system, a system administrator of the detected hardware error in dependence upon the hardware error data; generating, by the POS operating system, a service request message in dependence upon the hardware error data; and transferring, by the POS operating system, the service request message to the service dispatcher, the service dispatcher initiating a service call by the hardware service provider.

15 Claims, 3 Drawing Sheets (51) Int. Cl.
*G06Q 30/02* (2012.01)
*G06Q 30/06* (2012.01)

(56) References Cited

U.S. PATENT DOCUMENTS

| | | | | |
|---|---|---|---|---|
| 5,889,676 A * | 3/1999 | Kubo et al. | | 700/231 |
| 5,907,491 A * | 5/1999 | Canada et al. | | 700/108 |
| 5,965,860 A * | 10/1999 | Oneda | | 235/382 |
| 6,009,538 A * | 12/1999 | Goodwin et al. | | 714/25 |
| 6,122,073 A * | 9/2000 | Miyasaka et al. | | 358/434 |
| 6,173,422 B1 * | 1/2001 | Kimura et al. | | 714/57 |
| 6,934,955 B2 * | 8/2005 | Nickum | | 719/318 |
| 6,961,877 B2 * | 11/2005 | Si et al. | | 714/49 |
| 7,076,444 B1 * | 7/2006 | Baron et al. | | 705/14.26 |
| 7,146,544 B2 * | 12/2006 | Hsu et al. | | 714/57 |
| 7,197,534 B2 * | 3/2007 | Donoho et al. | | 709/204 |
| 7,225,253 B2 * | 5/2007 | Ofir et al. | | 709/224 |
| 7,232,063 B2 * | 6/2007 | Fandel et al. | | 235/383 |
| 7,263,506 B2 * | 8/2007 | Lee et al. | | 705/38 |
| 7,658,323 B2 * | 2/2010 | Kleinman et al. | | 235/380 |
| 8,856,034 B2 * | 10/2014 | Abraham | | 705/21 |
| 2002/0023109 A1 * | 2/2002 | Lederer, Jr. et al. | | 707/511 |
| 2002/0156849 A1 * | 10/2002 | Donoho et al. | | 709/205 |
| 2003/0114980 A1 * | 6/2003 | Klausner et al. | | 701/207 |
| 2003/0135381 A1 * | 7/2003 | Mathiesen et al. | | 705/1 |
| 2003/0185151 A1 * | 10/2003 | Kurosawa et al. | | 370/219 |
| 2005/0177345 A1 * | 8/2005 | Okuno et al. | | 702/187 |
| 2005/0256858 A1 * | 11/2005 | McArdle | | 707/4 |
| 2006/0129897 A1 * | 6/2006 | Gomyo | | 714/49 |
| 2007/0106559 A1 * | 5/2007 | Harrell | | 705/21 |
| 2007/0115108 A1 * | 5/2007 | Martin et al. | | 340/506 |
| 2007/0187422 A1 * | 8/2007 | Handfield et al. | | 221/13 |
| 2007/0192147 A1 * | 8/2007 | Liew et al. | | 705/5 |
| 2007/0233792 A1 * | 10/2007 | Sylthe et al. | | 709/206 |
| 2007/0265733 A1 * | 11/2007 | Harrell | | 700/283 |
| 2007/0288492 A1 * | 12/2007 | Chen et al. | | 707/100 |
| 2007/0288549 A1 * | 12/2007 | Shoji et al. | | 709/202 |
| 2007/0300207 A1 * | 12/2007 | Booth et al. | | 717/126 |
| 2008/0255901 A1 * | 10/2008 | Carroll et al. | | 705/7 |
| 2009/0192815 A1 * | 7/2009 | Canada | | 705/1 |
| 2010/0299217 A1 * | 11/2010 | Hui | | 705/23 |
| 2011/0320296 A1 * | 12/2011 | Edwards | | 705/23 |
| 2014/0081738 A1 * | 3/2014 | Abraham | | 705/14.38 |
| 2014/0316996 A1 * | 10/2014 | Maraz et al. | | 705/302 |

OTHER PUBLICATIONS

Felty, et al.; Feature Specification and Automated Conflict Detection; ACM Transactions on Software Engineering and Methodology; Jan. 2003, pp. 3-27; vol. 12, No. 1, ACM, Inc.; New York, NY, USA.

Herlein; The Linux Telephony Kernel API; pp. 1-8.

Mockus; Empirical Estimates of Software Availability of Deployed Systems; ISESE'06, Sep. 21-22, 2006; pp. 222-231; ACM; Rio de Janeiro, Brazil.

Palen, et al.; Beyond the Handset: Designing for Wireless Communications Usability; ACM Transactions on Computer-Human Interaction; Jun. 2002; pp. 125-151; vol. 9, No. 2; ACM, Inc.

Singh, et al.; Peer-to-Peer Internet Telephony using SIP; NOSSDAV'05, Jun. 13-14, 2005; pp. 63-68; ACM; Stevenson, Washington, USA.

IBM: "The RS/6000 Enterprise Server S Family Reliability, Availability, Serviceability", Technical White Paper, Sep. 1999.

IBM: "The IBM eserver pSeries 680 Reliability, Availability, Serviceability", Technical White Paper, Nov. 2000.

IBM: "The IBM eserver pSeries 690 Reliability, Availability, Serviceability", Technical White Paper, Sep. 2001.

Haiderzaidi: "IBM eserver pSeries 630 Reliability, Availability, Serviceability (RAS)", Version 1.0, Nov. 12, 2002, IBM Server Group, Austin, Texas.

Ahrens, et al.: "IBM POWER6 Processor-based Systems: Designing and Implementing Serviceability", IBM System p Platform Reliability, Availability, and Serviceability (RAS), Jun. 11, 2007.

* cited by examiner

INITIATING A SERVICE CALL FOR A HARDWARE MALFUNCTION IN A POINT OF SALE SYSTEM

BACKGROUND OF THE INVENTION

1. Field of the Invention

The field of the invention is data processing, or, more specifically, methods, apparatus, and products for initiating a service call for a hardware malfunction in a Point Of Sale ('POS') system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems and networks today that are much more ubiquitous and powerful than just a few years ago.

One of the most prevalent uses of these powerful computer systems and networks is for Point Of Sale ('POS') systems in retail establishments such as, for example, stores, restaurants, hotels, stadiums, casinos, and so on. Modern POS systems typically include one or more POS terminals connected to a POS controller that aggregates and administers POS transaction data. Each POS terminal is typically located on a checkout counter and used by an operator to complete customer sales. Each POS terminal is a computing device that typically includes a cash register, check/debit card/credit card reader, bar code reader or radio frequency identification ('RFID') chip reader, and so on. The POS terminals communicate over a network to various external transaction systems such as, for example, credit card processing systems, debit card processing systems, check processing systems, and so on.

Occasionally, the POS controllers or the POS terminals experience malfunctions due to software or hardware errors. Currently, however, no automated mechanism exists to identify whether the errors resulted from a software malfunction or a hardware malfunction. As such, a technician must manually examine any error data to identify whether the error is a software error or a hardware error and manually forward the error to the appropriate service group capable of diagnosing the error and fixing the malfunction. The process of manually examining the error data and forwarding the error data to the appropriate service group often adds significantly to the amount of time required to repair the malfunction. The delays in repairing the malfunction are typically costly to the retail establishment in terms of lost sales, customer satisfaction, decreased productivity, and so on.

SUMMARY OF THE INVENTION

Methods, apparatus, and products are disclose for initiating a service call for a hardware malfunction in a Point Of Sale ('POS') system, the POS system having one or more POS controller domains, each POS controller domain composed of a POS controller and one or more POS terminals, the POS controller operatively coupled to a service dispatcher for a hardware service provider through a data communications connection, that include: detecting, by a POS operating system installed on the POS controller, a hardware error within the POS controller domain, the hardware error described by hardware error data; notifying, by the POS operating system, an on-site system administrator of the detected hardware error in dependence upon the hardware error data; generating, by the POS operating system, a service request message in dependence upon the hardware error data; and transferring, by the POS operating system, the service request message to the service dispatcher, the service dispatcher initiating a service call by the hardware service provider.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for initiating a service call for a hardware malfunction in a POS system in accordance with the present invention are described with reference to the accompanying drawings, beginning with FIG. 1.

Figure 1:
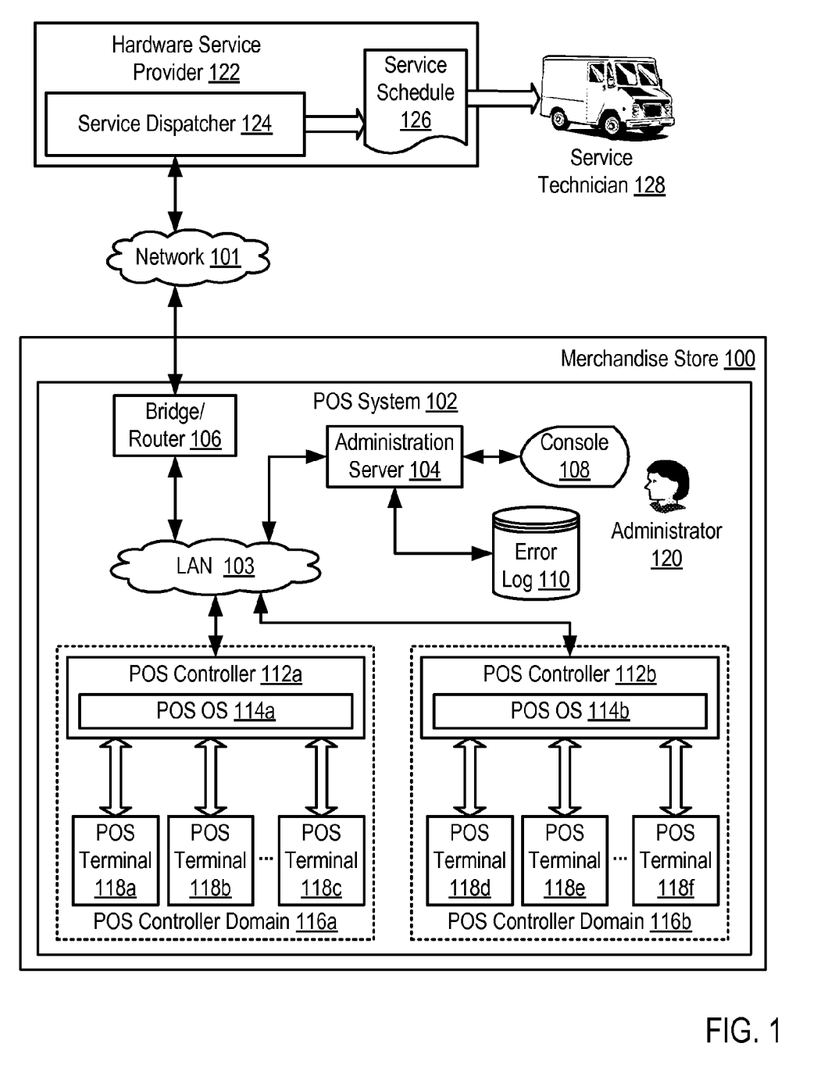
FIG. 1 sets forth a functional block diagram of an exemplary system capable of initiating a service call for a hardware malfunction in a POS system according to embodiments of the present invention.

FIG. 1 sets forth a functional block diagram of an exemplary system capable of initiating a service call for a hardware malfunction in a POS system according to embodiments of the present invention. The exemplary system of FIG. 1 includes a merchandise store (100) and a hardware service provider (122). The merchandise store (100) of FIG. 1 includes a POS system (102), and the hardware service provider (122) of FIG. 1 provides repair and maintenance services for the hardware of the merchandise store's POS system (102). The merchandise store (100) of FIG. 1 may be implemented as a grocery store, a hardware store, retail store, wholesale stores, or any other establishment for selling merchandise using a POS system as will occur to those of skill in the art.

In the exemplary system of FIG. 1, the POS system (102) includes two POS controller domains (116) connected together for data communications through a local area network ('LAN') (103). A POS controller domain is composed of a POS controller and the POS terminals controlled by that POS controller. In general, the POS devices in a POS controller domain are managed by the POS controller in that POS controller domain. In the example of FIG. 1, POS controller domain (116a) is composed of POS controller (112a) and POS terminals (118a-c). The POS controller domain (116b) of FIG. 1 is composed of POS controller (112b) and POS terminals (118d-f).

Each exemplary POS terminal (118) of FIG. 1 is a computing device used by store employees to complete transactions for customers at a checkout counter. Each POS terminal (118) of FIG. 1 may include user input devices such as, for example, a keyboard, touch screen, microphone, and so on. Each POS terminal (118) may also include a scanner capable of identifying purchase items using a barcode, RFID tag, or any other technology as will occur to those of skill in the art. Examples of POS terminals that may be improved for initiating a service call for a hardware malfunction in a POS system according to embodiments of the present invention include Toshiba's ST-7000 Modular POS Terminal, IBM's SurePOS™ 700 series of POS terminals, NCR's 7452-3500 POS terminal, and so on.

Each POS controller (112) of FIG. 1 is a computing device that manages one or more POS terminals, typically through specialized software installed on a computer server. Each POS controller (112) of FIG. 1 aggregates and administers POS transaction data received from and provided to each of the POS terminals in the POS controller domain controlled by that POS controller. In the example of FIG. 1, each POS controller (112) may serve as a gateway through which all POS transaction data in each controller's respective domain passes before being processes by other external payment processing systems such as, for example, check processing systems, debit card processing systems, credit card processing systems, and so on. In other embodiments, however, each POS terminal may communicate through a network directly with various external payment processing systems and provide the results of those communications for storage and processing to the respective POS controller that manages that POS terminal.

In the example of FIG. 1, each POS controller (112) has installed upon it a POS operating system (114). Each POS operating system (114) of FIG. 1 is specialized system software for managing each POS controller (112) and its corresponding POS terminals (118) in a POS system. An example of a POS operating system that may be useful in initiating a service call for a hardware malfunction in a POS system according to embodiments of the present invention may include the IBM 4690 operating system. The IBM 4690 operating system is a retail-focus computer operating system that much resembles DOS in interface and interaction. This proprietary operating system is offered by IBM to retail customers for operating its Supermarket Application ('SA')®, General Sales Application ('GSA')®, Chain Drug Sales Application ('CDSA')®, and ACE® retail platforms is based off the Flex OS, originally developed by Digital Research. Though the IBM 4690 operating system resembles DOS, much of its internal functions and behavior are much like the commercial UNIX™ operating systems.

In the example of FIG. 1, each POS operating system (114) operates generally for initiating a service call for a hardware malfunction in the POS system (102) according to embodiments of the present invention. Each POS operating system (114) of FIG. 1 operates generally for initiating a service call for a hardware malfunction in the POS system (102) according to embodiments of the present invention by: detecting a hardware error within the POS controller domain (116), the hardware error described by hardware error data; notifying an on-site system administrator (120) of the detected hardware error in dependence upon the hardware error data; generating a service request message in dependence upon the hardware error data; and transferring the service request message to a service dispatcher (124), the service dispatcher (124) initiating a service call by the hardware service provider (122). Readers will note that a hardware error is an error whose root cause is a malfunctioning hardware component. For example, a hardware error may be caused by a malfunctioning memory controller, processor, memory module, bus, adapter, and so on. Although a hardware error may cause other errors to occur, the root cause of a hardware error is that a hardware component is malfunctioning.

The POS operating system (114) may notify an on-site system administrator (120) of the detected hardware error by recording the hardware error data for the detected error in an error log (110). In the example of FIG. 1, each POS operating system (114) accesses the error log (110) through an administrative server (104), a computing device used by a system administrator (120) to monitor and manage the POS system (102). In addition to recording the hardware error data in the error log (110), the POS operating system (114) may also notify an on-site system administrator (120) of the detected hardware error by displaying the hardware error data for the detected error on a user interface of an administrative console (108). Because often the hardware error data is formatted in a manner that is not readily understandable to system administrators unable to decipher machine or assembly language, the POS operating system (114) may also notify an on-site system administrator (120) of the detected hardware error by generating an administrative error notification message based on the hardware error data and displaying the administrative error notification message on a user interface of an administrative console (108).

As mentioned above, the POS operating system transfers the service request message to a service dispatcher (124) in addition to notifying the on-site system administrator (120). In the example of FIG. 1, the service dispatcher (124) is a computing device that receives the service request message from a POS controller and initiates a service call by the hardware service provider (122) to repair or replace the malfunctioning hardware component causing the hardware error. The service dispatcher (124) of FIG. 1 initiates a service call by scheduling the service call in a service schedule (126). The service schedule (126) instructs a service technician (128) that a service call is needed for a particular POS system supported by the hardware service provider (122).

In the example of FIG. 1, each POS controller (112) is operatively coupled to the service dispatcher (124) for a hardware service provider through a data communications connection. In the example of FIG. 1, the data communication connection is provided through LAN (103), bridge/router (106), and network (101). Readers will note that the data communications connection illustrated in the FIG. 1 is for explanation only and not for limitation. Other implementations of the data communication connection as will occur to those of skill in the art may also be useful in initiating a service call for a hardware malfunction in a POS system according to embodiments of the present invention. Other exemplary data communication connections may be implemented using modems and analogue telephone lines, virtual private networks, private wide area networks ('WANs'), and so on.

The arrangement of components and devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Initiating a service call for a hardware malfunction in a POS system in accordance with embodiments of the present invention is generally implemented with computers, that is, with automated computing machinery. For explanation, therefore, FIG. 2 sets forth a block diagram of automated computing machinery comprising an exemplary POS controller (112) useful in initiating a service call for a hardware malfunction in a POS system according to embodiments of the present invention. The POS controller (112) of FIG. 2 includes at least one computer processor (156) or 'CPU' as well as random access memory (168) ('RAM') which is connected through a high speed memory bus (166) and bus adapter (158) to processor (156) and to other components of the computer.

Figure 2:
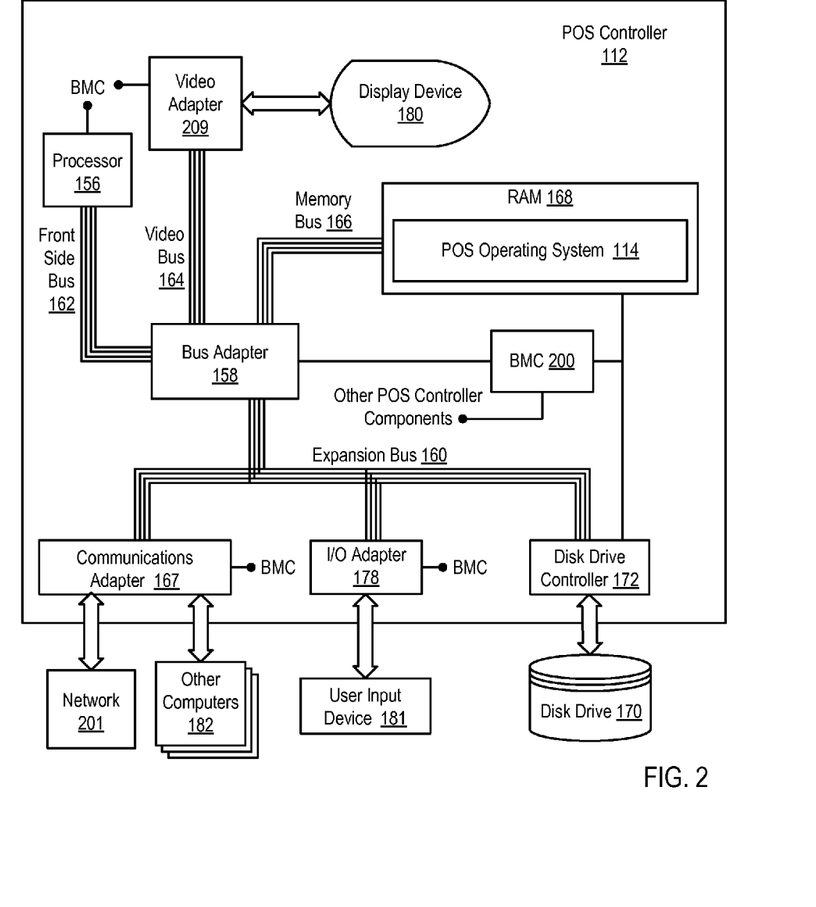
FIG. 2 sets forth a block diagram of automated computing machinery comprising an exemplary POS controller useful in initiating a service call for a hardware malfunction in a POS system according to embodiments of the present invention.

Stored in RAM (168) is a POS operating system (114). The POS operating system (114) of FIG. 2 is specialized system software for managing the POS controller (112) and any POS terminals in a POS system controlled by the POS controller (112). An example of a POS operating system that may be useful in initiating a service call for a hardware malfunction in a POS system according to embodiments of the present invention may include the IBM 4690 operating system. The POS operating system (114) in the example of FIG. 2 is shown in RAM (168), but many components of such software typically are stored in non-volatile memory also, for example, on a disk drive (170).

In the example of FIG. 2, the POS operating system (114) operates generally for initiating a service call for a hardware malfunction in a POS system according to embodiments of the present invention. The POS operating system (114) of FIG. 2 operates generally for initiating a service call for a hardware malfunction in the POS system according to embodiments of the present invention by: detecting a hardware error within a POS controller domain composed of the POS controller (112) and one or more POS terminals, the hardware error described by hardware error data; notifying an on-site system administrator of the detected hardware error in dependence upon the hardware error data; generating a service request message in dependence upon the hardware error data; and transferring the service request message to a service dispatcher for a hardware service provider, the service dispatcher initiating a service call by the hardware service provider. As mentioned above, a hardware error is an error whose root cause is a malfunctioning hardware component. For example, a hardware error may be caused by a malfunctioning memory controller, processor, memory module, bus, adapter, and so on.

The POS controller (112) of FIG. 2 also includes a baseboard management controller ('BMC') (200). The BMC (200) is a specialized microcontroller embedded in POS controllers and POS terminals that provides a diagnostic interface between system management software and platform hardware. The BMC (200) of FIG. 2 may be used to determine when a hardware component is malfunctioning and to alert the POS operating system through a processor interrupt or system message. Although not shown, a POS terminal may have a similarly installed BMC that communicates hardware malfunctions through a network (201) to the POS operating system (114).

In the example of FIG. 2, the BMC (200) connects to the various components of the POS controller (112) through an out-of-band network ('OOBN'). The OOBN of FIG. 2 may be implemented as an I2C bus, for example, a multi-master serial computer bus invented by Philips that is used to attach low-speed peripherals to a motherboard or an embedded system. I2C is a simple, low-bandwidth, short-distance protocol that employs only two bidirectional open-drain lines, Serial Data (SDA) and Serial Clock (SCL), pulled up with resistors. Although the exemplary POS controller (112) may utilize the I2C protocol, readers will note this is for explanation and not for limitation. In addition to the I2C protocol, the OOBN may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on.

Although FIG. 2 includes a BMC that alerts the POS operating system (114) of hardware malfunctions, readers will note that such an example is for explanation and not for limitation. In other embodiments, some hardware components in the POS controller and any of the POS terminals may be able to notify the POS operating system (114) upon performing a self-diagnostic that reveals a hardware malfunction. In still other embodiments, the POS operating system (114) or the POS terminal operating system may perform hardware diagnostics to identifying any malfunctioning hardware. Still further, other methods of alerting the POS operating system (114) that a hardware malfunction with the POS controller (112) or any POS terminal has occurred as will occur to those of skill in the art may also be useful in initiating a service call for a hardware malfunction in a POS system according to embodiments of the present invention.

The POS controller (112) of FIG. 2 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful for initiating a service call for a hardware malfunction in a POS system according to embodiments of the present invention include the Intel Northbridge, the Intel Memory Controller Hub, the Intel Southbridge, and the Intel I/O Controller Hub. Examples of expansion buses useful for initiating a service call for a hardware malfunction in a POS system according to embodiments of the present invention include Peripheral Component Interconnect ('PCI') buses and PCI Express ('PCIe') architectures.

The POS controller (112) of FIG. 2 includes disk drive adapter (172) coupled through expansion bus (160) and bus adapter (158) to processor (156) and other components of the POS controller (12). Disk drive adapter (172) connects non-volatile data storage to the POS controller (112) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example POS controller (112) of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example POS controller (112) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary POS controller (112) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, through analogue telephony networks and in other ways as will occur to those of skill in the art. Communications adapters implement the hardware level of data communications through which one computer sends data communications to another computer, directly or through a data communications network. Examples of communications adapters useful for initiating a service call for a hardware malfunction in a POS system according to embodiments of the present invention include modems for wired dial-up communications, Ethernet (IEEE 802.3) adapters for wired data communications network communications, and 802.11 adapters for wireless data communications network communications.

Readers will note that the exemplary architecture for the POS controller (112) in FIG. 2 is for explanation only and not for limitation. Other architectures as will occur to those of skill in the art may also be useful in implementing POS controllers according to embodiments of the present invention. Moreover, readers will note that although FIG. 2 describes an architecture for a POS controller, the POS terminals, administrative server, and service dispatcher described above with reference to FIG. 1 may be implemented in a manner similar to the POS terminal described with reference to FIG. 2. That is, the POS terminals, administrative server, and service dispatcher described above with reference to FIG. 1 may also include components such as, for example, processors, RAM, bus adapters, disk drive controllers, I/O adapters, communications adapters, and so on.

Figure 3:
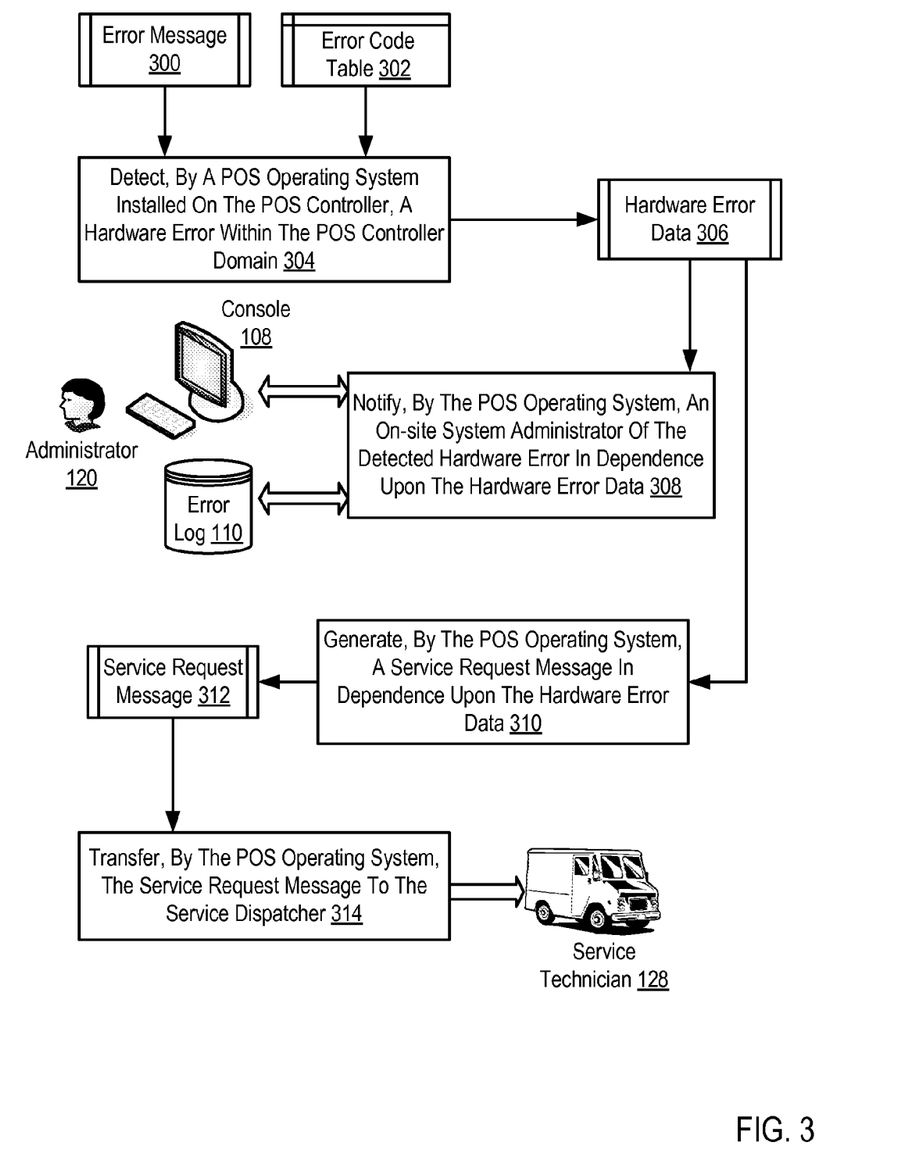
FIG. 3 sets forth a flow chart illustrating an exemplary method of initiating a service call for a hardware malfunction in a POS system according to embodiments of the present invention.

For further explanation, FIG. 3 sets forth a flow chart illustrating an exemplary method of initiating a service call for a hardware malfunction in a POS system according to embodiments of the present invention. The POS system described in FIG. 3 has one or more POS controller domains. Each POS controller domain is composed of a POS controller and one or more POS terminals. The POS controller is operatively coupled to a service dispatcher for a hardware service provider through a data communications connection. The hardware service provider is an organization that provides hardware service and support to the POS system described in FIG. 3. The hardware service provider may be part of the same organization that uses the POS system, may be organization that installed the POS system, or may be an independent hardware service provider that has a service contract with the organization that uses the POS system.

The method of FIG. 3 includes detecting (304), by a POS operating system installed on the POS controller, a hardware error within the POS controller domain. As mentioned above, a hardware error is an error whose root cause is a malfunctioning hardware component. For example, a hardware error may be caused by a malfunctioning memory controller, processor, memory module, bus, adapter, and so on. The hardware error is described by hardware error data. A POS operating system may detect (304) a hardware error within the POS controller domain according to the method of FIG. 3 by receiving an error message (300) that generally indicates that a software or hardware error has occurred. The error message (300) of FIG. 3 specifies an error code along with other data that describes the error. Because the error message (300) may describe a hardware or software error, the POS operating system may receive the error message (300) from any hardware or software component within the POS controller domain.

The POS operating system may then detect (304) a hardware error within the POS controller domain according to the method of FIG. 3 by determining whether the error is a hardware error in dependence upon the error message (300) and an error code table (302). The error code table (302) of FIG. 3 may associate error codes with indications of whether the error specified by the error code is a hardware error or a software error along with an identifier specifying the device or process originating the error. The error code table (302) of FIG. 3 may also associate error codes with high-level descriptions of the errors. For example, consider the following error code table:

TABLE 1

EXEMPLARY ERROR CODE TABLE

| ERROR CODE | ERROR TYPE | SOURCE ID | DESCRIPTION |
|---|---|---|---|
| 1001 | Hardware | POS_Ctrl_Processor | The POS Controller's processor is malfunctioning. |
| 1002 | Hardware | POS_Ctrl_Mem_Ctrl | The POS Controller's memory controller is malfunctioning. |
| 1003 | Software | POS_Ctrl_OS | The POS OS needs additional computer memory. |
| 1004 | Software | POS_Ctrl_OS | The POS OS is unable to open a file. |
| 1005 | Hardware | POS_Trm1_Processor | The processor of POS Terminal 1 is malfunctioning. |
| 1006 | Hardware | POS_Trm3_Disk | The disk drive of POS Terminal 3 is malfunctioning. |
| ... | ... | ... | ... |

The exemplary error code table above illustrates records for six exemplary error codes. The exemplary error code table above specifies that error code '1001' represents a hardware error originating with the processor of the POS controller. Error code '1002' represents a hardware error originating with the memory controller of the POS controller. Error code '1003' represents a software error originating with the operating system of the POS controller. Error code '1004' also represents a software error originating with the operating system of the POS controller. Error code '1005' represents a hardware error originating with the processor of the first POS terminal. Error code '1006' represents a hardware error originating with the disk drive of the third POS terminal. Readers will note that the exemplary error code table above is for explanation only and not for limitation.

Using the error code table (302) of FIG. 3, the POS operating system may determine whether the error is a hardware error according to the method of FIG. 3 by determining whether the error code table (302) specifies the error is a hardware error. If the error code table (302) specifies the error is a hardware error, then the POS operating system determines that the error is a hardware error. If the error code table (302) specifies the error is a software error, then the POS operating system does not determine that the error is a hardware error.

If the POS operating system determines that the error is a hardware error, the POS operating system may then detect (304) a hardware error within the POS controller domain according to the method of FIG. 3 by retrieving hardware error data (306) from the error code table (302) such as, for example, the device identifier specifying the malfunctioning hardware component. In some embodiments, the error message (300) may provide additional information concerning the error for which the error message (300) was generated than merely an error code. In such embodiments, if the POS operating system determines that the error is a hardware error, the POS operating system may then detect (304) a hardware error within the POS controller domain according to the method of FIG. 3 by retrieving hardware error data (306) from error message (300) itself. In still other embodiments, if the POS operating system determines that the error is a hardware error, the POS operating system may then detect (304) a hardware error within the POS controller domain according to the method of FIG. 3 by polling the hardware component or a device driver for the hardware component for the hardware error data (306).

The method of FIG. 3 also includes notifying (308), by the POS operating system, an on-site system administrator (120) of the detected hardware error in dependence upon the hardware error data (306). The POS operating system may notify (308) the on-site system administrator (120) of the detected hardware error according to the method of FIG. 3 according to the method of FIG. 3 by recording the hardware error data (306) for the detected error in an error log (110). The error log (110) may be stored locally by the POS controller or may be stored remotely through some other computer network connected to the POS controller. Periodically, the administrator (120) may review the records in the error log (110).

The POS operating system may also notify (308) the on-site system administrator (120) of the detected hardware error according to the method of FIG. 3 by displaying the hardware error data (306) for the detected error on a user interface of an administrative console (108). As mentioned above, the hardware error data (306) may be formatted in a manner that is not readily understandable to the system administrator (120) if the hardware error data (306) describes the error using machine or assembly language and the system administrator (120) is unable to decipher machine or assembly language. In such embodiments, the POS operating system may notify (308) the on-site system administrator (120) of the detected hardware error according to the method of FIG. 3 by generating an administrative error notification message in dependence upon the hardware error data and displaying the administrative error notification message on a user interface of an administrative console (108). The administrative error notification message may be a high-level description of the hardware error that generally describes the hardware error. The POS operating system may generate an administrative error notification message using a general description of the error in the error code table (302) as described above.

The method of FIG. 3 also includes generating (310), by the POS operating system, a service request message (312) in dependence upon the hardware error data (306). The service request message (312) of FIG. 3 is a request for a service technician (128) to arrive on-site at the POS system and repair the malfunctioning hardware component generating the hardware error. The service request message (312) of FIG. 3 may be implemented as an email, an XML-based document, a Java or C++ object, a proprietary message specified by the hardware service provider, or any other message as will occur to those of skill in the art. The POS operating system may generate (310) the service request message (312) according to the method of FIG. 3 by inserting the hardware error data (306) into a predefined service request message template. The predefined service request message template may be configured by the system administrator (120) to match the requirements of the hardware service provider. In other embodiments, the predefined service request message template may be downloaded from the service dispatcher for the hardware service provider.

The method of FIG. 3 includes transferring (314), by the POS operating system, the service request message (312) to the service dispatcher such that the initiates a service call by the hardware service provider. The service call is a trip made by a service technician to the location of the POS system in an effort to repair or replace the malfunctioning hardware component originating the hardware error. In some embodiments, the hardware error data (306) in the service request message (312) only specifies generally that the hardware error occurred without specifying any particular hardware component generating the hardware error. For example, the hardware error data may only indicate that POS terminal seven has a hardware malfunction without specifying which hardware component in POS terminal seven is malfunctioning. In such embodiments, the service technician (128) may have to perform extensive diagnostics and troubleshooting to determine the exact hardware component generating the error.

In other embodiments, the hardware error data (306) may specify a particular hardware component generating the hardware error. For example, the hardware error data (306) in the service request message (312) may specify that the memory controller of POS terminal seven in POS controller domain three is experiencing a hardware malfunction. In such embodiments, the service technician (128) is generally able to diagnose and fix the hardware malfunction faster than when the hardware error data only specifies generally that the hardware error occurred without specifying any particular hardware component generating the hardware error.

The POS operating system may transfer (314) the service request message (312) to the service dispatcher according to the method of FIG. 3 by sending the service request message (312) to the service dispatcher at a predefined network address configured by the system administer. In other embodiments, the predefined network address may be downloaded by POS operating system from a location designated by the hardware service provider.

The POS operating system may transfer (314) the service request message (312) to the service dispatcher according to the method of FIG. 3 through a data communications connection implemented using the existing communications infrastructure in the POS system. In some older communications infrastructures, the data communications connection may be implemented using analogue telephone lines and modems. In other communications infrastructures, the data communication connection may be implemented using a digital communication lines.

Exemplary embodiments of the present invention are described largely in the context of a fully functional computer system for initiating a service call for a hardware malfunction in a POS system. Readers of skill in the art will recognize, however, that the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of initiating a service call for a hardware malfunction in a Point Of Sale ('POS') system, the POS system having one or more POS controller domains, each POS controller domain composed of a POS controller and one or more POS terminals, the POS controller operatively coupled to a service dispatcher for a hardware service provider through a data communications connection, the method comprising:

receiving, by a POS operating system installed on the POS controller, an error message which specifies an error code;

determining, by the POS operating system, based on the error code and an error code table, that the malfunction in the POS controller domain is a hardware error, wherein the error code table associates error codes with indications of whether the error specified by the error code is a hardware error or a software error;

in response to determining that the malfunction in the POS controller domain is a hardware error, detecting, by a POS operating system, the hardware error within a POS terminal controller domain, by polling hardware components of the POS controller domain for hardware error data, wherein the hardware error data specifies a particular hardware component of the POS controller domain that is generating the hardware error;

wherein the POS controller aggregates and administers POS transaction data received from and provided to each of the POS terminals in the POS controller domain controlled by the POS controller;

notifying, by the POS operating system, an on-site system administrator of the detected hardware error in dependence upon the hardware error data;

generating, by the POS operating system, a service request message in dependence upon the hardware error data; and transferring, by the POS operating system, the service request message to the service dispatcher, the service dispatcher initiating a service call by the hardware service provider.

2. The method of claim 1 wherein notifying, by the POS operating system, an on-site system administrator of the detected hardware error in dependence upon the hardware error data further comprises recording the hardware error data for the detected error in an error log.

3. The method of claim 1 wherein notifying, by the POS operating system, an on-site system administrator of the detected hardware error in dependence upon the hardware error data further comprises displaying the hardware error data for the detected error on a user interface of an administrative console.

4. The method of claim 1 wherein notifying, by the POS operating system, a system administrator of the detected hardware error in dependence upon the hardware error data further comprises:

generating an administrative error notification message in dependence upon the hardware error data; and displaying the administrative error notification message on a user interface of an administrative console.

5. The method of claim 1 wherein the hardware error data only specifies generally that the hardware error occurred without specifying any particular hardware component generating the hardware error.

6. A Point Of Sale ('POS') controller for initiating a service call for a hardware malfunction in a POS system, the POS system having one or more POS controller domains, each POS controller domain composed of a POS controller and one or more POS terminals, the POS controller operatively coupled to a service dispatcher for a hardware service provider through a data communications connection, the POS controller comprising a computer processor, a computer memory operatively coupled to the computer processor, the computer memory having disposed within it computer program instructions, that when executed by the computer processor, cause the computer processor to carry out the steps of:

receiving, by a POS operating system installed on the POS controller, an error message which specifies an error code;

determining, by the POS operating system, based on the error code and an error code table, that the malfunction in the POS controller domain is a hardware error, wherein the error code table associates error codes with indications of whether the error specified by the error code is a hardware error or a software error;

in response to determining that the malfunction in the POS controller domain is a hardware error, detecting, by a POS operating system, the hardware error within a POS terminal controller domain, by polling hardware components of the POS controller domain for hardware error data, wherein the hardware error data specifies a particular hardware component of the POS controller domain that is generating the hardware error;

wherein the POS controller aggregates and administers POS transaction data received from and provided to each of the POS terminals in the POS controller domain controlled by the POS controller;

notifying, by the POS operating system, an on-site system administrator of the detected hardware error in dependence upon the hardware error data;

generating, by the POS operating system, a service request message in dependence upon the hardware error data; and transferring, by the POS operating system, the service request message to the service dispatcher, the service dispatcher initiating a service call by the hardware service provider.

7. The POS controller of claim 6 wherein notifying, by the POS operating system, an on-site system administrator of the detected hardware error in dependence upon the hardware error data further comprises recording the hardware error data for the detected error in an error log.

8. The POS controller of claim 6 wherein notifying, by the POS operating system, an on-site system administrator of the detected hardware error in dependence upon the hardware error data further comprises displaying the hardware error data for the detected error on a user interface of an administrative console.

9. The POS controller of claim 6 wherein notifying, by the POS operating system, a system administrator of the detected hardware error in dependence upon the hardware error data further comprises:
   generating an administrative error notification message in dependence upon the hardware error data; and
   displaying the administrative error notification message on a user interface of an administrative console.

10. The POS controller of claim 6 wherein the hardware error data only specifies generally that the hardware error occurred without specifying any particular hardware component generating the hardware error.

11. A computer program product for initiating a service call for a hardware malfunction in a Point Of Sale ('POS') system, the POS system having one or more POS controller domains, each POS controller domain composed of a POS controller and one or more POS terminals, the POS controller operatively coupled to a service dispatcher for a hardware service provider through a data communications connection, the computer program product disposed in a computer readable recordable medium, the computer program product comprising computer program instructions, that when executed by a computer, cause the computer to carry out the steps of:
   receiving, by a POS operating system installed on the POS controller, an error message which specifies an error code;
   determining, by the POS operating system, based on the error code and an error code table, that the malfunction in the POS controller domain is a hardware error, wherein the error code table associates error codes with indications of whether the error specified by the error code is a hardware error or a software error;
   in response to determining that the malfunction in the POS controller domain is a hardware error, detecting, by a POS operating system, the hardware error within a POS terminal controller domain, by polling hardware components of the POS controller domain for hardware error data, wherein the hardware error data specifies a particular hardware component of the POS controller domain that is generating the hardware error;
   wherein the POS controller aggregates and administers POS transaction data received from and provided to each of the POS terminals in the POS controller domain controlled by the POS controller;
   notifying, by the POS operating system, an on-site system administrator of the detected hardware error in dependence upon the hardware error data;
   generating, by the POS operating system, a service request message in dependence upon the hardware error data; and
   transferring, by the POS operating system, the service request message to the service dispatcher, the service dispatcher initiating a service call by the hardware service provider.

12. The computer program product of claim 11 wherein notifying, by the POS operating system, an on-site system administrator of the detected hardware error in dependence upon the hardware error data further comprises recording the hardware error data for the detected error in an error log.

13. The computer program product of claim 11 wherein notifying, by the POS operating system, an on-site system administrator of the detected hardware error in dependence upon the hardware error data further comprises displaying the hardware error data for the detected error on a user interface of an administrative console.

14. The computer program product of claim 11 wherein notifying, by the POS operating system, a system administrator of the detected hardware error in dependence upon the hardware error data further comprises:
   generating an administrative error notification message in dependence upon the hardware error data; and
   displaying the administrative error notification message on a user interface of an administrative console.

15. The computer program product of claim 11 wherein the hardware error data only specifies generally that the hardware error occurred without specifying any particular hardware component generating the hardware error.

* * * * *